United States Patent
Lin et al.

(10) Patent No.: US 7,245,572 B2
(45) Date of Patent: Jul. 17, 2007

(54) APPARATUS FOR PID ADDRESS PROTECTION AND METHOD THEREOF

(75) Inventors: Jia-Hau Lin, Tai-Chung Hsien (TW); Chi-Ming Chang, Tao-Yuan Hsien (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 489 days.

(21) Appl. No.: 10/904,212

(22) Filed: Oct. 28, 2004

(65) Prior Publication Data

US 2005/0120261 A1 Jun. 2, 2005

(30) Foreign Application Priority Data

Dec. 2, 2003 (TW) .............................. 92133915 A

(51) Int. Cl.
*G11B 7/00* (2006.01)
(52) U.S. Cl. .............................. 369/53.33; 369/124.07; 369/47.48
(58) Field of Classification Search ............. 369/53.33, 369/53.32, 53.34, 47.48, 124.07
See application file for complete search history.

(56) References Cited

U.S. PATENT DOCUMENTS 6,594,215 B2 * 7/2003 Moriwaki ................ 369/53.35

* cited by examiner

*Primary Examiner*—Nabil Hindi
(74) *Attorney, Agent, or Firm*—Winston Hsu

(57) ABSTRACT

A protecting device installed in an optical storage system for protecting a plurality of physical identification data synchronous signals includes a synchronous pattern detecting device, a data synchronous signal insertion device for adding the amount of data synchronous signals to a first predetermined number, a counting/reloading device for sequentially counting the first predetermined number of data synchronous signals and an additional second predetermined number of data synchronous signals, a PID window generator for generating a plurality of protecting windows respectively corresponding to the plurality of physical identification data synchronous signals while the counting/reloading device is counting the second predetermined number of data synchronous signals, and a PID synchronous signal protection device for protecting the plurality of physical identification data synchronous signals according to the plurality of protecting windows.

22 Claims, 9 Drawing Sheets

APPARATUS FOR PID ADDRESS PROTECTION AND METHOD THEREOF

BACKGROUND

The invention relates to an apparatus for PID address protection, and more particularly, to an apparatus and a method for protecting a plurality of physical identification data synchronous signals by counting a plurality of data synchronous signals or number of frames in an optical storage system.

As information and multimedia technology progresses, so too does the storage needs—i.e. storage densities and capacitances of storage devices—of computers, communication equipment, and consumer products. A storage device with high storage density, small size, and low cost is more and more necessary for today's information flows. As a result, an optical storage medium such as an optical disc has been one of the most common storage mediums in recent years because of its small volume and weight, and low cost. Especially with the invention of CD-R, which allows users to write data on an optical disc according to their needs, the optical disc has become one of the most important portable and personal storage mediums. As a result, how to make the data accessing of the optical disc more reliable and efficient is the research focus in the industry now.

Digital versatile discs (DVD), which, with its high capacity and definition, is widely used for backup and playing and storing video data, is currently the best optical storage medium. The standards of digital versatile discs (DVD) include DVD-R, DVD-RAM, DVD-RW, and etc, which all have many characteristics in common. Similar to the CD, a DVD has a plurality of tracks for storing data. Additionally, in order to manage stored data easily, sectors in each track are utilized to accomplish stored-data planning. Each sector can be divided into many frames, and the information is stored in each frame of the DVD.

For example, in an optical disc of DVD-RAM, each sector is about 2700 bytes, and a header composed of complementary allocated pit addresses CAPA is in the front of each sector. Please refer to FIG. 1, which is a diagram of each sector 10 in a DVD-RAM optical disc according to the prior art. Each sector 10 of a DVD-RAM optical disc includes two main parts: a header 12 and a data-storing area 14 used for storing data. The information in the header 12 includes the physical position of the sector 10 of a DVD-RAM optical disc because if an optical storage system reads data from the DVD-RAM optical disc or writes data into the DVD-RAM optical disc, the optical storage system first has to know the correct position corresponding to the data in order to complete the read/write operation.

In a determined standard of DVD-RAM, the header 12 occupies 128 bytes, and the data-storing area 14, which has the biggest storing space, occupies 2418 bytes. In addition to the header 12 and data-storing area 14, the sector 10 further includes a PS synchronous signal area (PS). A PS, being 3 bytes and located before the data-storing area 14, is used to provide a synchronization timing for detecting the data-storing area 14 next to the PS.

Please refer to FIG. 2, which is a detailed diagram of the header 12 in FIG. 1. The header 12 is divided into four sub-headers, respectively the first sub-header H1, the second sub-header H2, the third sub-header H3, and the fourth sub-header H4. Each sub-header H1~H4 includes a voltage frequency oscillator (VFO) area, an address mark (AM) area, a physical identification data (PID) area, an identification error detection (IED) area, and a PA area. For example, the first sub-header H1 includes a first voltage frequency oscillator (VFO1) area, a first address mark (AM1) area, a first physical identification data (PID1) area, a first identification error detection (IED1) area, and a first PA (PA1) area. The second, third, and fourth sub-headers are similar to the first sub-header. In a sub-header, each physical identification data (PID) area stores a PID, which includes the most important address information that can be used for being an address reference of an optical pick up head when accessing data. Additionally, the address mark (AM) area is positioned in front of the PID area for providing a physical identification data synchronous signal PIDS, (also called an address mark signal AM signal) to be a synchronous timing for detecting the physical identification data (PID). Therefore, for accurately decoding the PID stored in each sub-header H1~H4, the AM area of each sub-header H1~H4 has to be detected first, and then the PIDS generated by the AM area is utilized for decoding the following PID to read/write data.

A DVD-RAM standard is taken as an example again. Information stored in DVD-RAM is an eight-to fourteen modulation plus (EFM+) data signal. Generally speaking, in prior art, the eight-to fourteen modulation plus (EFM+) data signal is a signal type generated by an optical pickup module (not shown in the FIG. 1) in an optical storage system (such as a DVD drive) after reading related information on the data tracks of DVD-RAM. In the DVD standard, the EFM+ data signal can be regarded as having the data type shown in FIG. 1. The header 12 of each sector 10 (especially the first sub-header H1) represents the initial position of the sector 10.

Please refer to FIG. 1 again, FIG. 1 also shows four impulse signals corresponding to the header 12 in FIG. 1. The four impulse signals are respectively a first physical identification synchronous signal PIDS1, a second physical identification synchronous signal PIDS2, a third physical identification synchronous signal PIDS3, and a fourth physical identification synchronous signal PIDS4. And the four physical identification synchronous signals PIDS1~PIDS4 are respectively generated by detecting the first address mark area to the fourth address mark area AM1~AM4. In the normal procedure of demodulating the EFM+data signal, four physical identification data synchronous signals PIDS1~PIDS4 have to be detected. This means that PIDS1~PIDS4 (such as the four impulses PIDS1~PIDS4 shown in FIG. 1) are generated in sequence for detecting the following: first to the fourth PID. However, because of defects of DVD-RAM or noises of the system, the related optical pickup module incorrectly detects things (such as the impulse MS shown in FIG. 1) as physical identification data synchronous signals PIDS in the non-headers(or in the incorrect position of headers 12) so that incorrect data are regarded as a PID and an error in the addressing operation of the optical pickup head occurs.

SUMMARY

It is therefore a primary objective of the claimed invention to provide an apparatus and a method to solve the above-mentioned problem that can utilize counting a plurality of data synchronous signals or frames to protect a plurality of physical identification data of an optical storage medium.

In the disclosure of the present invention, the present invention provides a method which utilizes data synchronous signals as the reference in counting, generates at least one protecting window, determines that the PIDS detected in the protecting window is correct, and ignores the PIDS which is not in the protecting window after sequentially counting a predetermined number of data synchronous signals so that the data after each detected PIDS is determined to be a real PID.

In the embodiment of the present invention, we utilize a data synchronous signal insertion device for adding the number of data synchronous signals to a predetermined number to make it easy for a counting/reloading device to count the predetermined number of data synchronous signals. Additionally, the present invention utilizes the characteristics of a known data length and a position of an individual specific data synchronous signal to make the counting/reloading device execute a reload operation to reset a counting value to 0 for ensuring the accuracy of the data synchronous signal insertion device when detecting a first format signal and a PS synchronous signal.

In the device of the preferred embodiment of the present invention, the device includes a counter for counting the address of the PIDS. When determining an address of a PIDS in a protecting window, the counter reloads the address of the PIDS according to a predetermined address to improve decoding efficiency of the PID.

According to a preferred embodiment of the claimed invention, a device for protecting a plurality of PID synchronous signals in an optical storage system includes: a synchronous pattern detecting device used for detecting at least one synchronous signal wherein the at least one synchronous signal comprises data synchronous signals and the PID synchronous signals; a data synchronous signal insertion device that is connected to the synchronous pattern detecting device used for adding the amount of data synchronous signals to a first predetermined number; a counting/reloading device that is connected to the data synchronous signal insertion device used for sequentially counting the first predetermined number of data synchronous signals and an additional second predetermined number of data synchronous signals; a PID window generator that is connected to the counting/reloading device used for generating a plurality of protecting windows respectively corresponding to the plurality of physical identification data synchronous signals while the counting/reloading device is counting the second predetermined number of data synchronous signals; and a PID synchronous signal protection device that is connected to the PID window generator used for protecting the plurality of physical identification data synchronous signals according to the plurality of protecting windows.

Also disclosed is a method for protecting a plurality of PID synchronous signals in an optical storage system. The optical storage system includes a synchronous pattern detecting device, a data synchronous signal insertion device, a counting/reloading device, a PID window generator, and a PID synchronous signal protection device. The method includes: utilizing the synchronous pattern detecting device to detect at least one synchronous signal wherein the at least one synchronous signal comprises a data synchronous signal and the PID synchronous signal; utilizing the data synchronous signal insertion device add the number of the data synchronous signal to a first predetermined number; utilizing the counting/loading device to count the first predetermined number of the data synchronous signals in order and then immediately utilizing the counting/loading device count a second predetermined number of the data synchronous signals in addition; utilizing the PID window generator to generate a plurality of protecting windows respectively corresponding to the PID synchronous signals when the counting/reloading device counts the second predetermined number of the data synchronous signals; and utilizing the PID synchronous signal protection device to protect the PID synchronous signals according the protecting windows.

Furthermore, a method for protecting a plurality of PID synchronous signal by counting a number of frames of a modulated data signal is disclosed. The method includes: step (a)—adding the number of frames of the modulated data signal to a first predetermined number; step (b)—after step (a), counting the first predetermined number of frames in order; step (c)—after step (a), generating a second predetermined number of frames according to the first predetermined number of frames; and step (d)—after step (b) and step (c), continuously counting the second predetermined number of frames in order and generating a plurality of protecting windows respectively corresponding to the PID synchronous signals during counting the second predetermined number of frames.

These and other objectives of the claimed invention will no doubt become obvious to those of ordinary skill in the art after reading the following detailed description of the preferred embodiment that is illustrated in the various figures and drawings.

DETAILED DESCRIPTION

Every optical storage medium includes headers, which store addresses or other important information. For example, in DVD-RAM, which uses a plurality of connected sectors arranged to store information, the information stored in the header includes the position of the sector. Note that each sector can be regarded as being composed of a plurality of frames. According to the DVD-RAM standard, each sector includes two main parts, a header and a data storing area, which respectively occupies 3 frames and 26 frames. In other words, a sector occupies 29 frames wherein each frame can be regarded as a synchronous frame corresponding to a synchronous signal (SC).

Figure 1:
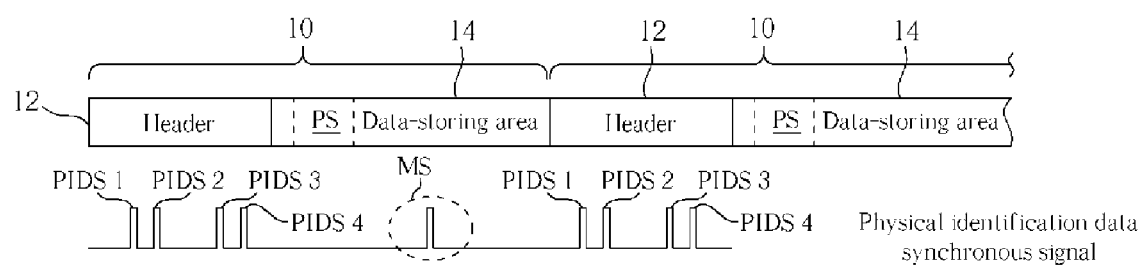
FIG. 1 is a diagram of each sector in a DVD-RAM optical disc according to the prior art.
Figure 3:
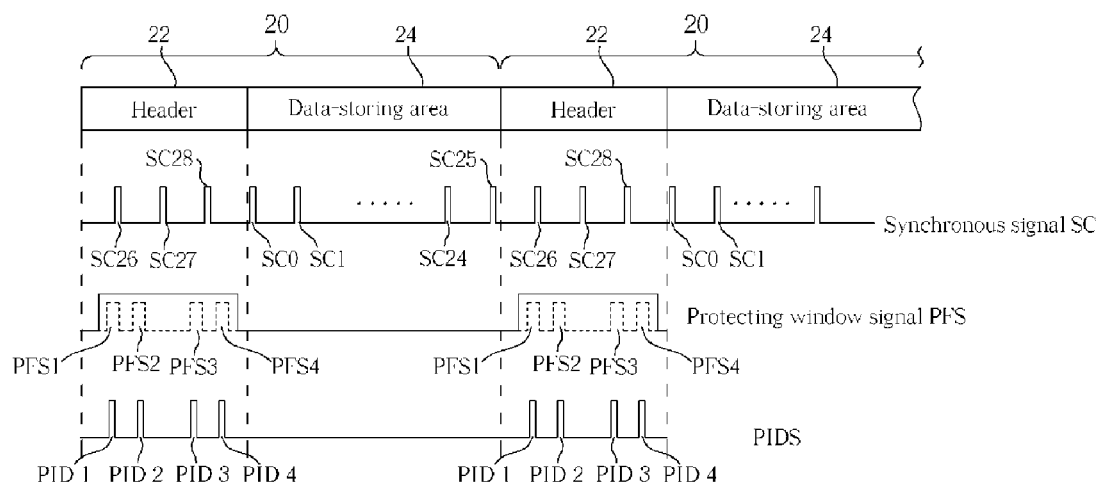
FIG. 3 is a diagram of corresponding relationship between sectors in an optical disc of DVD-RAM and synchronous signals.

For substantially describing the present invention's technical characteristic of utilizing counting the number of frames of a modulated data signal to protect the data of header, please refer to FIG. 3, which is a diagram of corresponding relationship between sectors 20 in an optical disc of DVD-RAM and synchronous signals SC. FIG. 3 further shows a corresponding protecting window signal PFS and a protected PIDS. The modulated data signal is an EFM+data signal. In the data structure shown in FIG. 3, the data-storing area of each sector 20 occupies 26 frames corresponding to 26 synchronous signals SC. The 26 synchronous signals SC can be defined as SC0 to SC25; furthermore, the header 22 of each sector 20 occupies 3 frames, which corresponds to 3 synchronous signals SC and connects to the data-storing area 24 of sector 20. The 3 synchronous signals SC can be defined as SC26 to SC28. Because each frame occupies the same amount of space, the period of counting each synchronous signal SC is the same. Therefore, when the SC25 is counted and the SC26 is being prepared to be counted, the system is able to know that the detecting area has moved into the header 22. To avoid falsely detecting a PIDS in the non-header and thereby cause an addressing error such as in the prior art in FIG. 1, the present invention first counts SC0 to SC25, and then the system detects header 22 after counting 26 synchronous signals (SC0 to SC25) in data storing area. At this time, the present invention utilizes a protecting window signal PFS to protect the PID and the PIDS of the header 22. This means when the system counts SC26 to SC28, the PFS is simultaneously generated so that the present invention optical storage system is able to accurately detect the PIDS of the header 22 according to the PFS. After all 29 synchronous signals (SC0 to SC28) have been counted, the system of the present invention resets the counting value to 0, and then restarts counting.

Figure 2:
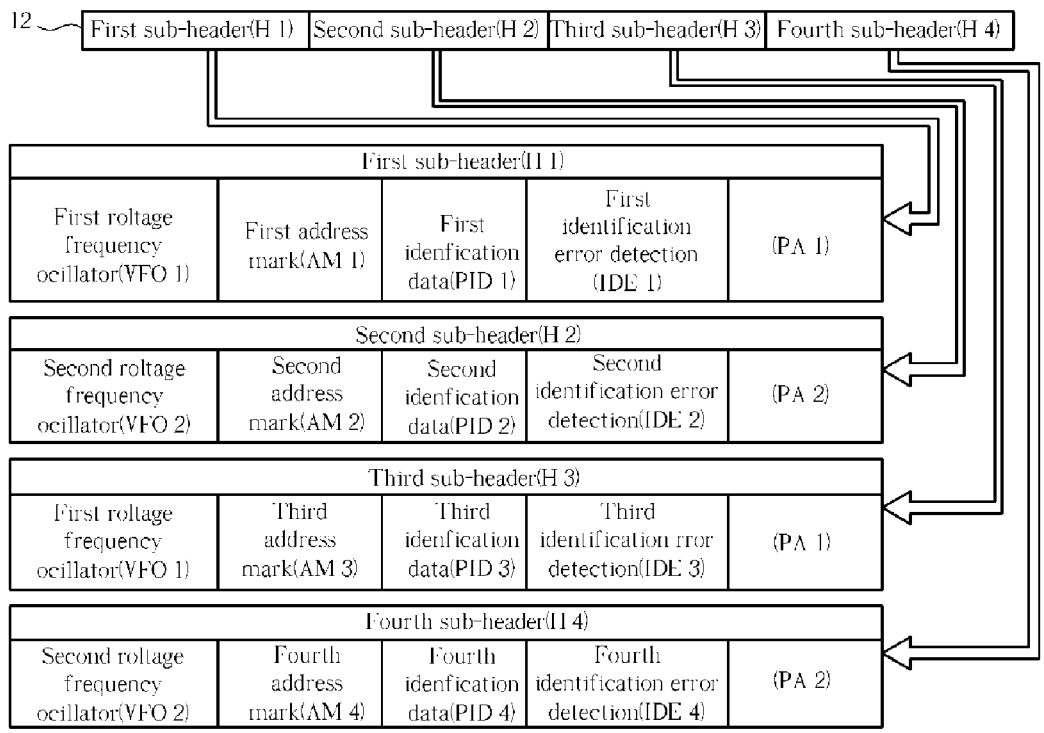
FIG. 2 is a detailed diagram of the header in FIG. 1.

Additionally, PFS in the present invention includes a plurality of protecting windows, and the number of protecting windows are equal to the number of physical identification data synchronous signals PIDS. Each protecting window corresponds to a physical identification data synchronous signal PIDS. Please refer to FIG. 2 again. In the standard of DVD-RAM, the header 22 is divided into the first sub-header H1 to the fourth sub-header H4, which respectively include the first physical identification data PID1 to the fourth physical identification data PID4. A physical identification data synchronous signal PIDS is utilized before each physical identification data PID for providing synchronous detecting timing. Therefore, the PFS in the embodiment of FIG. 3 has to include 4 protecting windows labeled as the first window to the fourth protecting window PFS1~PFS4, respectively corresponding to the PID1~PID4. When the system detects PIDS1 to PIDS4 of each sub-header H1 to H4, only the PIDS corresponding to the protecting window is correct. This means that the physical identification data synchronous signals PIDS corresponding to the first protecting window PFS1 is the correct first physical identification data synchronous signals PIDS1. The same corresponding relationships between PFS2 and PIDS2, PFS3 and PIDS3, and PFS4 and PIDS4 are the same as the corresponding relationship between PFS1 and PIDS1 and thus omitted here.

Figure 4:
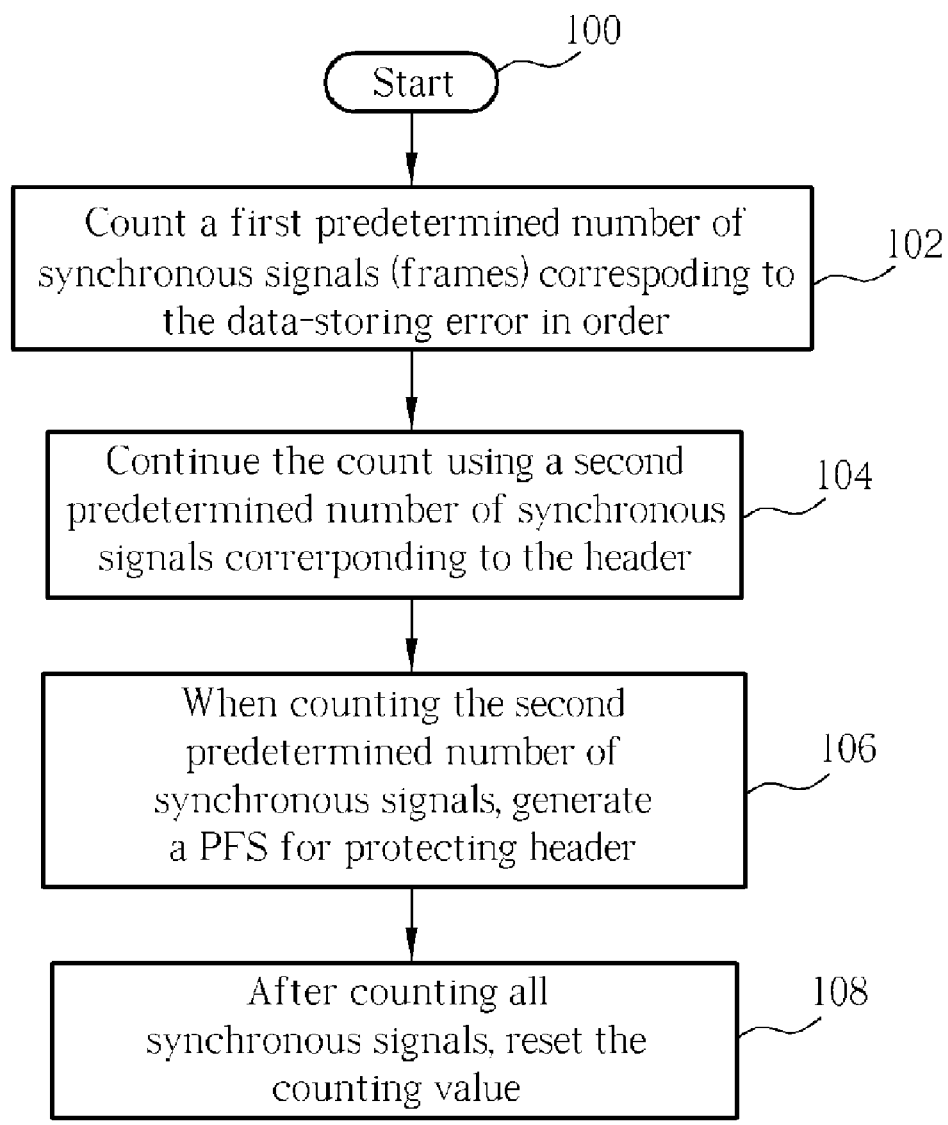
FIG. 4 is a flow chart of an embodiment in the present invention.

To sum up what we mentioned above, the present invention utilizes the number of counting frames (synchronous signals, SC) to protect the physical identification data synchronous signals PIDS of the header 22 of a modulated data signal, and the steps are illustrated in FIG. 4, which is a flow chart of an embodiment of the present invention.

Step 100: start;

Step 102: count a first predetermined number of frames (synchronous signals, SC) in order, wherein the first predetermined number of synchronous signals SC correspond to a modulated data signal of a non-header of a data-storing area 24. In the DVD-RAM standard, the data-storing area 24 occupies 26 frames (the first predetermined number is 26). In this embodiment, this means counting from the SC0 to SC25 and then going to step 104;

Step 104: since the header 22 follows the data-storing area 24 and the header 22 occupies a second predetermined number of frames (the number of frames occupied by the second predetermined number in this embodiment is 3), after counting SC25, it continues forward, counting SC26, SC27, and SC28 which correspond to the header 22 while simultaneously executing step 106 before at last going to step 108;

Step 106: generate a PFS for protecting the header 22 during the counting of SC26, SC27, and SC28, wherein the PFS includes 4 protecting windows PFS1~PFS4 for respectively protecting the first physical identification data synchronous signal to the fourth physical identification data synchronous signal (PIDS1~PIDS4), and then going to step 108;

Step 108: reset the counting value to 0 and complete the detection and protection of the first physical identification data synchronous signal to the fourth physical identification data synchronous signal (PIDS1~PIDS4) of the modulated data signal after counting 29 synchronous signals SC0~SC28 corresponding to 29 frames; additionally, when detecting next modulated data signal, go to step 100 and count from the $0^{th}$ synchronous signal SC0 again.

In actual implementation, the type of above-mentioned synchronous signals SC0~SC28 is a data synchronous signal DSC, and the 26 synchronous signals SC0~SC25 corresponding to the data-storing area 24 are 26 data synchronous signals DSC0~DSC25 which respectively store related synchronous address information of data stored in the 26 frames. However, when the data are lost or evening some cases, the data don't exist or other reasons causes the 26 data synchronous signals DSC0~DSC25 not to be detected, the system has to add the number of data synchronous signals of the modulated signal to 26 for completely counting the 26 data synchronous signals DSC0~DSC25 to accurately evaluate the 26 frames occupied by the data-storing area. The method of adding the number is inserting a fake DSC on the position where the data synchronous signals should be present but no DSC has been detected so that the number of DSCs adds up to 26.

Furthermore, the header 22 in actuality does not generate the corresponding 3 data synchronous signals. In other words, the $26^{th}$ synchronous signal SC26, the $27^{th}$ synchronous signal SC27, the $28^{th}$ synchronous signal SC28 in step 204 are fake data synchronous signals used only for counting the frame number occupied by the header. Therefore, for accurately evaluating 3 frames occupied by the header 22, the present invention generates extra 3 fake data synchronous signals (DSC26~DSC28) according to the 26 synchronous signals (SC0~SC25) of the pre-header 24. This means that after counting the $25^{th}$ data synchronous signal DSC25, it counts the extra 3 data synchronous signals DSC26~DSC28; then at last resets the counting value to 0 for restarting the count.

Figure 5:
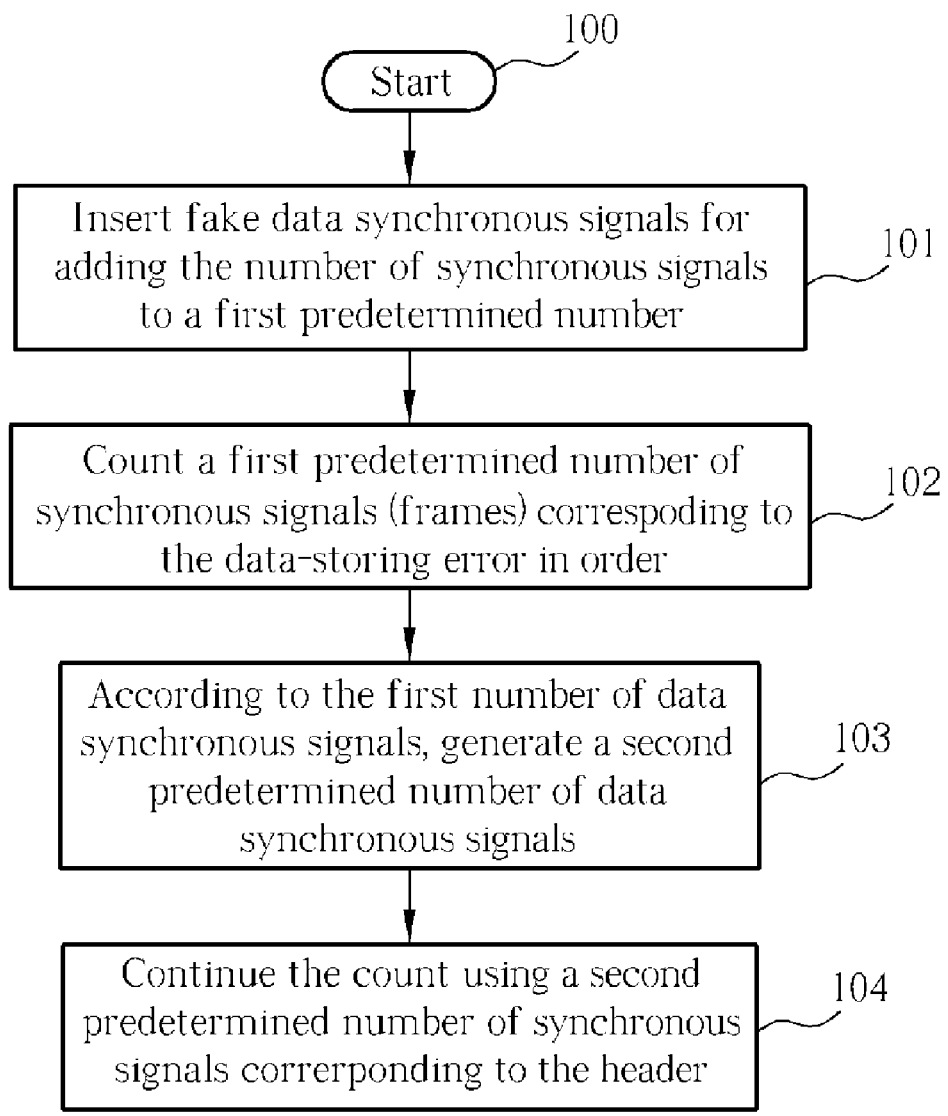
FIG. 5 is a flow chart of another embodiment in FIG. 4 in the present invention.

Therefore, in the flow of the embodiment of the present invention, how a number of data synchronous signals can be added to 26 is shown in step 102. Furthermore, a step is inserted between step 102 and step 104 to describe the procedure of generating 3 data synchronous signals DSC26~DSC28 corresponding to the header 22. Please refer to FIG. 5, which is a flow chart of another implementation in FIG. 4 in the present invention. The newly added steps 101 and 103 are illustrated as follows.

Figure 6:
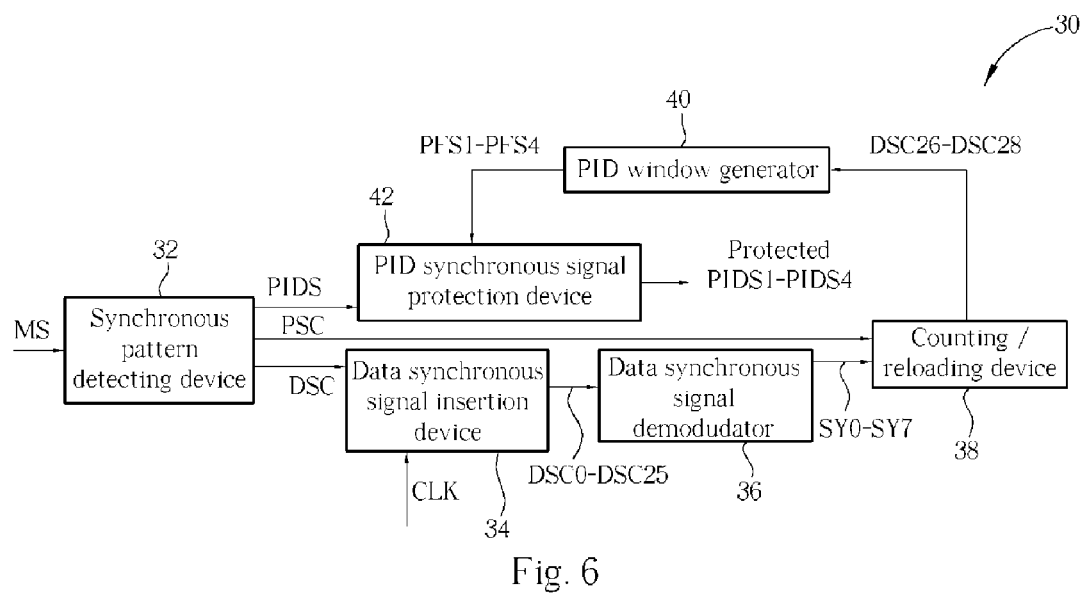
FIG. 6 is a block diagram of an embodiment in the present invention.

Step 101: insert a fake DSC on the position of the modulated data signal corresponding to the data-storing area 24 where a data synchronous signal should be present but is not present for adding the number of data synchronous signals to 26 (the first predetermined number is 26);

Step 103: generate 3 data synchronous signals DSC26~DSC28 (the second predetermined number is 3) according to the 26 data synchronous signals DSC0~DSC25 to make the 3 data synchronous signals DSC26~DSC28 connect to the previous 26 data synchronous signals DSC0~DSC25 and to make the 3 data synchronous signals DSC26~DSC28 and the previous the 26 data synchronous signals DSC0~DSC25 become a continuous data synchronous signal DSC having the same period;

After realizing the basic technical characteristic of the present invention, the actual related hardware of the embodiment is shown in FIG. 6, which is a block diagram of an embodiment of the present invention. FIG. 6 shows a protecting device 30 for protecting the PIDS of the header 22. The protecting device is utilized in an optical storage system, and includes a synchronous pattern detecting device 32, a data synchronous signal insertion device 34, a data synchronous pattern demodulator 36, a counting/reloading device 38, a PID window generator 40, and a PID synchronous signal protection device 42. The synchronous pattern detecting device 32 is used to receive a modulated signal MS, which can be an EFM+data signal in this embodiment. The synchronous pattern detecting device 32 is capable of detecting all sorts of synchronous signals SC which includes the above-mentioned DSC and PIDS. The data synchronous signal insertion device 34 is electrically connected to the synchronous pattern detecting device 32 and utilized to insert a fake data synchronous signal DSC at the position where the data synchronous signal DSC should be present but is not present according to a counting clock CLK for adding the number of the data synchronous signals DSC to 26 for demodulating the following data when data synchronous signals DSC are not detected after the synchronous pattern detecting device 32 first detects a data synchronous signal DSC. The data synchronous pattern demodulator 36 is electrically connected to the data synchronous signal insertion device 34 and utilized for demodulating the added 26 data synchronous signals (DSC0~DSC25) to generate at least a first format signal SY0, a second format signal SY1 . . . to an $8^{th}$ format signal SY7. In fact, each of the 26 data synchronous signals (DSC0~DSC25) respectively corresponds to the $1^{st}$ to the $8^{th}$ format signal (SY0~SY7) to be a data synchronous header of each DSC for figuring out the corresponding position of each DSC and of each sector 20. Therefore, the order of the 26 data synchronous signals (DSC0~DSC25) is determined. For example, in the DVD standard, the data synchronous signal DSC having the $1^{st}$ format signal SY0 is defined as DSC0 which represents the starting position of the data-storing area 24 in FIG. 3.

The counting/reloading device 38 is electrically coupled to the data synchronous signal demodulator 36 and is used for utilizing a counting value to count the 26 data synchronous signals (DSC0~DSC25) according the demodulated format signals (SY0~SY7) and to count the following extra 3 data synchronous signals (DSC26~DSC28). In addition to the function of technique, the counting/reloading device 38 of the present invention further includes a technical characteristic of reloading operation. When the first format signal SY0 is detected (this represents when DSC0 is detected), the counting/reloading device 38 executes the reloading operation to reset the counting value to 0 for restarting the count and making it easy for the data synchronous signal insertion device 34 to insert the fake data synchronous signals DSC to accurately add the number of the data synchronous signals DSC to 26. Additionally, as mentioned above, the sector 20 includes a PS synchronous signal area (PS) which generates a PS synchronous signal PSC used for providing a synchronous timing to detect the following data-storing area 24. Therefore, as shown in FIG. 6, after the synchronous pattern detecting device 32 detects the PS synchronous signal PSC, the counting/reloading device 38 executes the reloading operation to reset the counting value for restarting the count. So, even if the counting value is more or less incorrect, the counting value can be adjusted through the above-mentioned mechanism so that the data synchronous signal insertion device 34 can insert the data synchronous signals DSC at the correct position for adding the number of data synchronous signals DSC.

The PID window generator 40 is electrically connected to the counting/reloading device 38 and used for generating four protecting windows PFS1~PFS4 when counting the $26^{th}$ synchronous signal SC26, the $27^{th}$ synchronous signal SC27, and the $28^{th}$ synchronous signal SC28. The protecting windows are used to protect the header 22 and respectively protect the $1^{st}$ to $4^{th}$ physical identification synchronous signal PIDS1~PIDS4. The PID synchronous signal protection device 42 is electrically connected to the PID window generator 40 and the synchronous pattern detecting device 32 for receiving the four protecting windows PFS1~PFS4 generated by the PID window generator 40, determining that the physical identification data synchronous signals PIDS detected in the protecting windows are correct according to the protecting windows when the synchronous pattern detecting device 32 detects the $1^{st}$ physical identification data synchronous signal to the $4^{th}$ physical identification data synchronous signal PIDS1~PIDS4, and ignoring the physical identification data synchronous signals PIDS not detected in the protecting windows. Therefore, the data following the detected physical identification data synchronous signals PIDS are determined to be real PID so that the $1^{st}$ PID to $4^{th}$ PID can be accurately determined and protected for completing the following demodulation.

Figure 7:
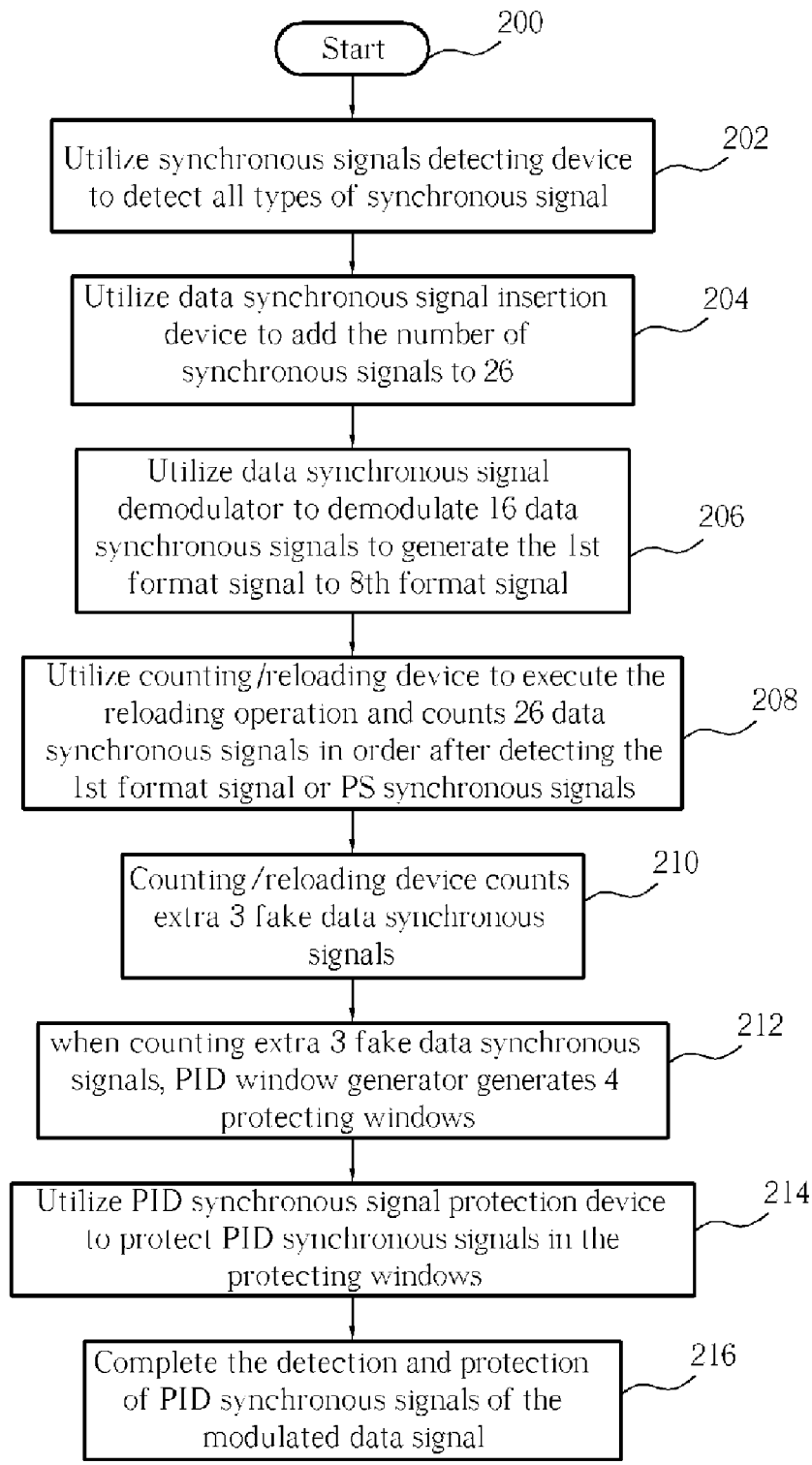
FIG. 7 is a flow chart of a detailed embodiment in the present invention.

Based on the structure of the protecting device 30 in FIG. 6, the embodiment of the present invention for protecting a plurality of PIDS is shown in FIG. 7, which is a flow chart of a detailed implementation in the present invention.

Step 200: start;

Step 202: utilize the synchronous pattern detecting device 32 to detect all sorts of synchronous signals SC which includes DSC, PIDS, and PSC, and execute step 204;

Step 204: utilize the data synchronous signal insertion device 34 to insert a fake data synchronous signal DSC at the position where the data synchronous signal DSC should be present but is not present for adding the number of data synchronous signals DSC to 26, set the 26 data synchronous signals DSC as DSC0~DSC25, and execute step 206;

Step 206: utilize the data synchronous signal demodulator 36 to demodulate the 26 data synchronous signals (DSC0~DSC25) for generating at least a $1^{st}$ format signal SY0 to $8^{th}$ format signal SY7 and execute step 208;

Step 208: utilize the counting/reloading device 38 to utilize a counting value to count the DSC0 to the DSC25 in order according to the $1^{st}$ format signal to the $8^{th}$ format signal and execute step 210. In the actual implementation, before counting DSC0 and after detecting $1^{st}$ format signal SY0 or PS synchronous signal PSC, the counting/reloading device 38 executes a reloading operation to reset the counting value to 0;

Step 210: after the counting/reloading device 38 counts DSC25, the counting/reloading device 38 continues to count 3 extra fake data synchronous signals DSC corresponding to SC26, SC27, and SC28 and simultaneously executes step 212;

Step 212: when the counting/reloading device 38 counts 3 extra fake data synchronous signals DSC corresponding to SC26, SC27, and SC28, the protecting window generator 40 generates four protecting windows PFS1~PFS4 for protecting four sub-headers of the header 22 and for respectively protect the $1^{st}$ physical identification data synchronous signal to $4^{th}$ physical identification data synchronous signal (PIDS1~PIDS4), and then go to step 214;

Step 214: when the synchronous pattern detecting device 32 detects the $1^{st}$ physical identification data synchronous signal to $4^{th}$ physical identification data synchronous signal (PIDS1~PIDS4), utilize the PID synchronous signal protection device 42 to protect the physical identification data synchronous signals PIDS detected in the protecting windows according to the corresponding protecting windows for outputting the protected $1^{st}$ physical identification data synchronous signal to $4^{th}$ physical identification data synchronous signal (PIDS1~PIDS4), and then go to step 216;

Step 216: after the counting/reloading device 38 counts the 29 synchronous signals (SC0~SC28)(after SC28 has been counted), the counting/reloading device 38 executes the reloading operation to reset the counting value to 0 to complete the detection and protection of the $1^{st}$ physical identification data synchronous signal to $4^{th}$ physical identification data synchronous signal PIDS1~PIDS4 of the modulated data signal MS.

Figure 8:
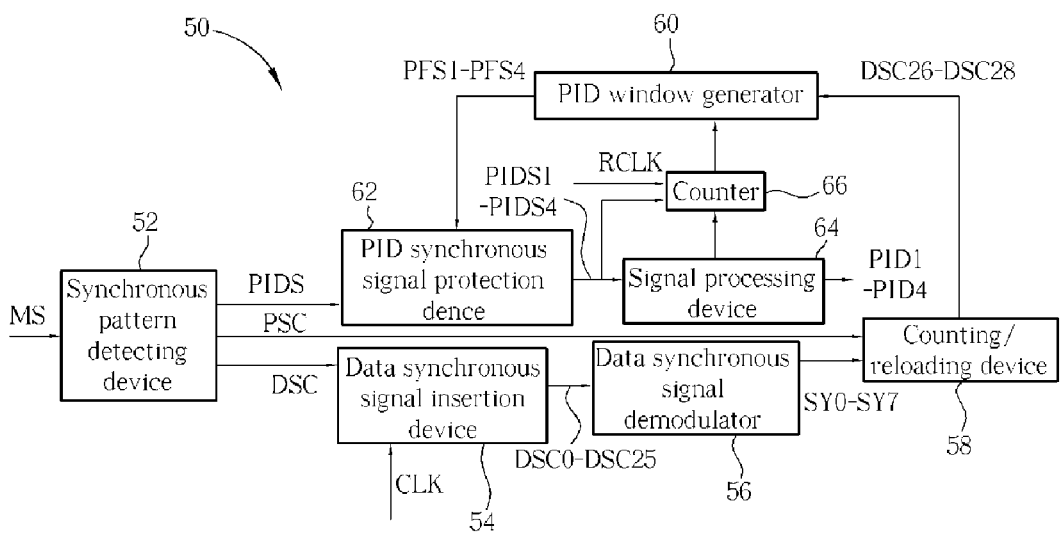
FIG. 8 is a functional block diagram of another embodiment in the present invention.
Figure 9:
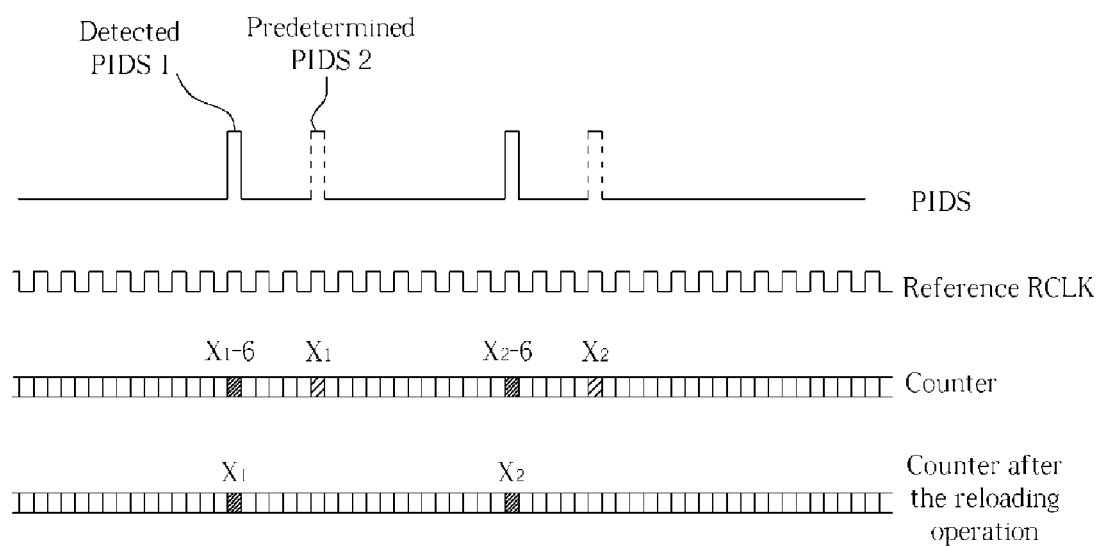
FIG. 9 is a diagram of a counter of the embodiment in FIG. 8 when executing a reloading operation.

Please note that in the present invention protecting device 30, for further ensuring the accuracy of detected PIDS1~PIDS4 and the following demodulating efficiency of PID, another embodiment of the present invention includes a counter which uses a reference clock RCLK to count the addresses of PIDS1~PIDS4. Please refer to FIG. 8 and FIG. 9. FIG. 8 is a functional block diagram of another embodiment in the present invention, and FIG. 9 is a diagram of a counter of the embodiment in FIG. 8 when executing a reload operation. The protecting device 50 follows the structure of that in FIG. 6 and includes a synchronous pattern detecting device 52, a data synchronous signal insertion device 54, a data synchronous pattern demodulator 56, a counting/reloading device 58, a PID window generator 60, and a PID synchronous signal protection device 62. Furthermore, the protecting device 50 further includes a signal processing device 64, and the above-mentioned counter 66. The signal processing device 64 is electrically connected to the PID synchronous signal protection device 62. The signal processing device 64 demodulates the PID corresponding to the PIDS after the PID synchronous signal protection device 62 protects any one of the physical identification data synchronous signals PIDS. The counter 66 utilizes a predetermined address to reload the address of the PIDS when determining the address of the PIDS according to the reference clock RCLK and feedbacks the result to the PID window generator 60 for dynamically adjusting the position of next protecting window. The actual implementation is shown in FIG. 9. In FIG. 9, according to the reference clock RCLK, the address detected by the $1^{st}$ PIDS (PIDS1) is $X_1$-6; however, the predetermined address of the $1^{st}$ PIDS (PIDS1) is $X_1$. Under the technical characteristic, the detected address $X_1$-6 is reloaded to $X_1$. Because the period of each physical identification data synchronous signal PIDS is fixed, the detected address $2^{nd}$ physical identification data synchronous signal (PIDS2) is automatically reloaded to $X_2$ instead of $X_2$-6. Therefore, it matches the predetermined address. Other physical identification data synchronous signals are identical, thus omitted here. So, the detecting efficiency of physical identification data synchronous signal PIDS is improved.

The technical characteristic of the present invention is utilized in the optical storage medium that includes headers and uses frames (synchronous signal) to arrange storing spaces, but is not limited to be utilized in DVD-RAM. The present invention utilizes data synchronous signals as a reference in counting. After counting a predetermined number of data synchronous signals, the detecting area enters the header. At this time, the present invention utilizes generating a plurality of protecting windows to protect correct physical identification synchronous signals to demodulate the real physical identification data signals. Additionally, the present invention utilizes known data length and the characteristic of the position of individual specific data synchronous signal for detecting a first format signal, a PS synchronous signal, or executes a reloading operation after counting all data synchronous signals corresponding to a sector for resetting a counting value to 0 to ensure the accuracy of inserted the data synchronous signals. Furthermore, the present invention utilizes a predetermined address to reload any one of detected physical identification data synchronous signals PIDS. This improves the detecting efficiency of data synchronous signal and the demodulating efficiency of physical identification data.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A device for protecting a plurality of PID synchronous signals in an optical storage system comprising:

a synchronous pattern detecting device used for detecting at least one synchronous signal wherein the at least one synchronous signal comprises data synchronous signals and PID synchronous signals;

a data synchronous signal insertion device that is connected to the synchronous pattern detecting device used for adding the amount of data synchronous signals to a first predetermined number;

a counting/reloading device that is connected to the data synchronous signal insertion device used for sequentially counting the first predetermined number of data synchronous signals and an additional second predetermined number of data synchronous signals;

a PID window generator that is connected to the counting/reloading device used for generating a plurality of protecting windows respectively corresponding to the plurality of physical identification data synchronous signals while the counting/reloading device is counting the second predetermined number of data synchronous signals; and a PID synchronous signal protection device that is connected to the PID window generator used for protecting the plurality of physical identification data synchronous signals according to the plurality of protecting windows.

2. The device of claim 1 further comprising a data synchronous pattern demodulator, which is connected to the data synchronous signal insertion device and the counting/ reloading device and is used for demodulating the first predetermined number of data synchronous signals to generate at least a first format signal to an eight format signal wherein the counting/reloading device executes a reload operation for resetting a counting value zero according to the first format signal.

3. The device of claim 2 wherein the at least one synchronous signal further comprises at least one PS synchronous signal, and after the synchronous pattern detecting device detects the at least one PS synchronous signal, the counting/reloading device executes the reload operation for resetting the counting value zero.

4. The device of claim 1 wherein after the counting/reloading device counts the first predetermined number and the second predetermined number of the data synchronous signals, the counting/loading device executes a reload operation for resetting a counting value zero.

5. The device of claim 1 wherein the optical storage system further comprises a signal processing device that is electrically connected to the PID synchronous signal protection device wherein after the PID synchronous signal protection device protects any one of the PID synchronous signals, the signal processing device demodulates a PID corresponding to the PID synchronous signal.

6. The device of claim 5 further comprising a counter for counting the addresses of the PID synchronous signals wherein when the PID synchronous signal protection device determines one or every one of the addresses of the PID synchronous signals, the counter reloads the address of the PID synchronous signal according to a predetermined address.

7. The device of claim 1 being utilized in the optical storage medium wherein the optical storage medium is an optical disc of DVD-RAM or the like, and the PID synchronous signal corresponds to at least one header of the optical storage medium.

8. The device of claim 7 wherein the number of the PID synchronous signals and the number of the protecting windows are both four, and the first predetermined number is 26 and the second predetermined number is 3.

9. The device of claim 7 wherein the synchronous pattern detecting device receives at least an eight-to-fourteen modulation data signal.

10. A method for protecting a plurality of PID synchronous signals in an optical storage system, the optical storage system comprising a synchronous pattern detecting device, a data synchronous signal insertion device, a counting/reloading device, a PID window generator, and a PID synchronous signal protection device; and the method comprising:
utilizing the synchronous pattern detecting device to detect at least one synchronous signal wherein the at least one synchronous signal comprises a data synchronous signal and the PID synchronous signal;
utilizing the data synchronous signal insertion device to add the number of the data synchronous signal to a first predetermined number;
utilizing the counting/loading device to count the first predetermined number of the data synchronous signals in order and then immediately utilizing the counting/loading device to count a second predetermined number of the data synchronous signals in addition;
utilizing the PID window generator to generate a plurality of protecting windows respectively corresponding to the PID synchronous signals when the counting/reloading device counts the second predetermined number of the data synchronous signals; and
utilizing the PID synchronous signal protection device to protect the PID synchronous signals according the protecting windows.

11. The method of claim 10 wherein the optical storage system further comprises another data synchronous pattern demodulator that is electrically connected to the data synchronous signal insertion device and the counting/loading device, and the method further comprises:
utilizing the data synchronous pattern demodulator to demodulate the predetermined number of data synchronous signals for generating at least a first format signal to eight format signal; and
utilizing the counting/loading device to execute a reload operation for resetting a counting value to zero according to the first format signal.

12. The method of claim 11 wherein the at least one data synchronous signal further comprises a PS synchronous signal, and the method further comprises:
utilizing the counting/reloading device to execute the reload operation for resetting the counting value to zero after the synchronous pattern detecting device detects the PS synchronous signal.

13. The method of claim 10 further comprising:
utilizing the counting/reloading device to execute a reload operation for resetting a counting value after the counting/reloading device additionally counts the second predetermined number of data synchronous signals.

14. The method of claim 10 wherein the optical storage system further comprises a signal processing device that is electrically connected to the PID synchronous signal protection device, and the method further comprises:
the signal processing device demodulating a PID corresponding to the PID synchronous signal after the PID synchronous signal protection device protects any one of the PID synchronous signals.

15. The method of claim 14 wherein the optical storage system further comprises a counter for counting addresses of the PID synchronous signals, and the method further comprises:
when the PID synchronous signal protection device has determined one or every one of the addresses of the PID synchronous signals, utilizing the counter to reload the address of the PID synchronous signal according to a predetermined address.

16. The method of claim 10 being utilized in an optical storage medium, which is an optical disc of DVD-RAM or the like.

17. The method of claim 16 wherein the number of the PID synchronous signals and the number of the protecting windows are both four, and the first determined number is 26 and the second determined number is 3.

18. A method for protecting a plurality of PID synchronous signal by counting a number of frames of a modulated data signal comprising:
(a) adding the number of frames of the modulated data signal to a first predetermined number;
(b) after step (a), counting the first predetermined number of frames in order;
(c) after step (a), generating a second predetermined number of frames according to the first predetermined number of frames;
(d) after step (b) and step (c), continuously counting the second predetermined number of frames in order and generating a plurality of protecting windows respectively corresponding to the PID synchronous signals during counting the second predetermined number of frames.

19. The method of claim 18 further comprising:
(e) executing a reload operation for resetting the number of frames to zero after counting the first predetermined number of frames and the second predetermined number of frames.

20. The method of claim 18 being utilized in an optical storage medium, which is an optical disc of DVD-RAM or the like wherein the number of the PID synchronous signals and the number of the protecting windows are both four, and the first predetermined number is 26 and the second predetermined number is 3.

21. The method of claim 20 wherein the PID synchronous signal corresponds to at least one header of the optical storage medium.

22. The method of claim 18 wherein anyone of the frames corresponds to a data synchronous signal.

* * * * *